US010472878B2

(12) United States Patent
Hoermann

(10) Patent No.: US 10,472,878 B2
(45) Date of Patent: Nov. 12, 2019

(54) SYSTEM OF ACTUATING A DOOR

(71) Applicant: Marantec Antriebs—und Steuerungstechnik GmbH & Co. KG, Marienfeld (DE)

(72) Inventor: Michael Hoermann, Halle/Westf. (DE)

(73) Assignee: Marantec Antriebs—Und Steuerungstechnik GmbH & Co. KG, Marienfeld (DE)

( * ) Notice: Subject to any disclaimer, the term of this patent is extended or adjusted under 35 U.S.C. 154(b) by 0 days.

(21) Appl. No.: 15/729,147

(22) Filed: Oct. 10, 2017

(65) Prior Publication Data
US 2018/0283082 A1 Oct. 4, 2018

(30) Foreign Application Priority Data

Apr. 3, 2017 (DE) .................... 20 2017 001 770 U

(51) Int. Cl.
*E05F 15/77* (2015.01)
*E05F 15/42* (2015.01)
*G05B 15/02* (2006.01)
*E05B 47/00* (2006.01)

(52) U.S. Cl.
CPC .............. *E05F 15/77* (2015.01); *E05F 15/42* (2015.01); *G05B 15/02* (2013.01); *E05B 47/0001* (2013.01)

(58) Field of Classification Search
None
See application file for complete search history.

(56) References Cited

U.S. PATENT DOCUMENTS

| 2003/0001752 A1* | 1/2003 | Teves ................. H05B 37/0209 340/693.9 |
| 2008/0156052 A1* | 7/2008 | Speyer ................. E05C 19/001 70/277 |
| 2008/0231442 A1* | 9/2008 | Schafer ................ E05F 15/668 340/540 |
| 2009/0059814 A1* | 3/2009 | Nixon .................... H04L 41/12 370/254 |
| 2012/0137585 A1* | 6/2012 | Brown ............... E06B 9/17007 49/31 |

(Continued)

FOREIGN PATENT DOCUMENTS

WO 0193220 A1 12/2001

OTHER PUBLICATIONS

Digi-Key's European Editors, "Bluetooth® Brings Its Mesh Networking to the Internet of Things," Digi-Key Electronics Article Library Website, Available Online at https://www.digikey.com/en/articles/techzone/2015/oct/bluetooth-brings-its-mesh-networking-to-the-internet-of-things, Oct. 8, 2015, 4 pages.

*Primary Examiner* — Chun Cao
*Assistant Examiner* — Charles Cai
(74) *Attorney, Agent, or Firm* — McCoy Russell LLP

(57) ABSTRACT

A system of actuating a door includes an actuator for driving an actuating motor of the system, in particular for carrying out an opening or closing movement of the door, a sensor for detecting a state of the system, and a control unit for connecting the actuator and the sensor, the control unit configured to control the system in its totality. The actuator, the sensor, and the control unit are each provided with a communication apparatus, with the plurality of communication apparatus being configured to automatically set up a wireless communication network between one another.

15 Claims, 1 Drawing Sheet

(56) References Cited

U.S. PATENT DOCUMENTS

| | | | |
|---|---|---|---|
| 2014/0125499 A1* | 5/2014 | Cate | E05F 15/60 340/933 |
| 2015/0007500 A1* | 1/2015 | Schatz | E05F 15/60 49/70 |
| 2015/0059989 A1* | 3/2015 | Gutierrez | E06B 9/62 160/10 |
| 2015/0275564 A1* | 10/2015 | Rosenthal | E05F 15/77 700/275 |

* cited by examiner

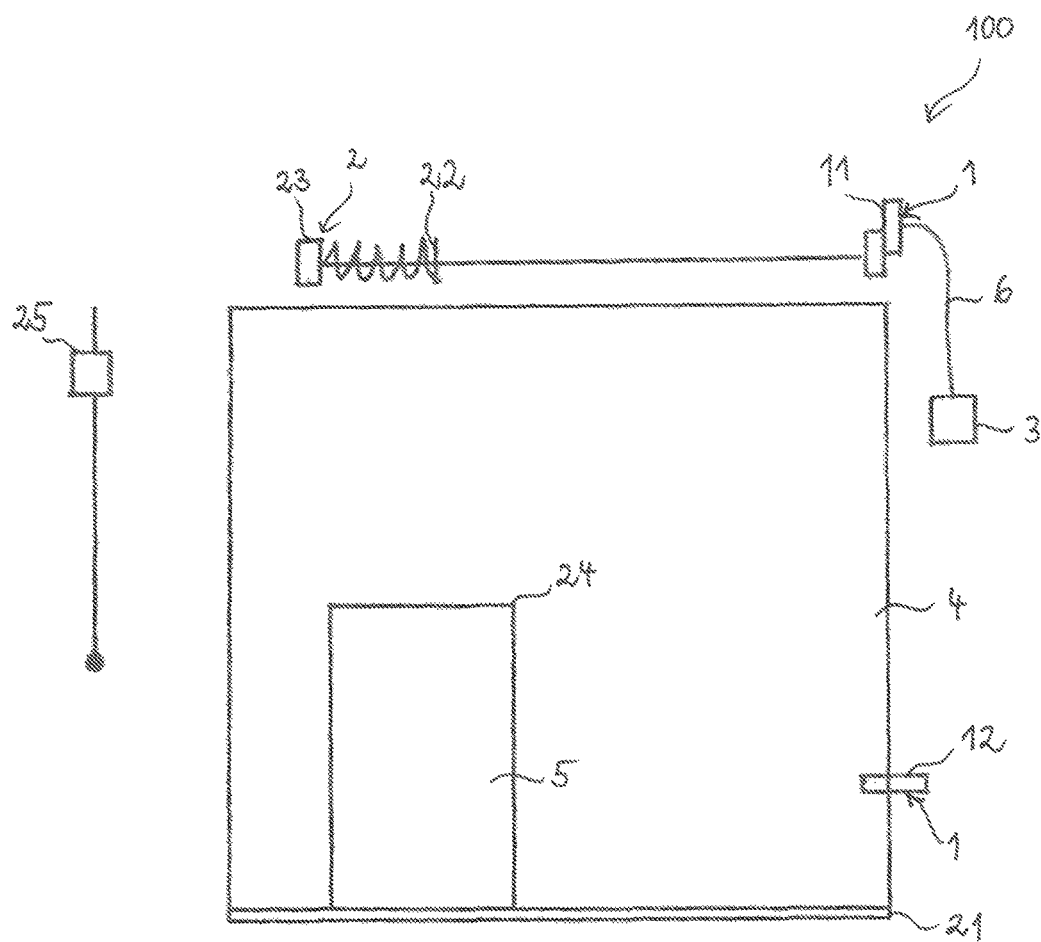

SYSTEM OF ACTUATING A DOOR

CROSS REFERENCE TO RELATED APPLICATIONS

This application claims priority to German Utility Model Application No. 20 2017 001 770.9, entitled "SYSTEM OF ACTUATING A DOOR," filed Apr. 3, 2017, the entire contents of which is hereby incorporated by reference in its entirety for all purposes.

TECHNICAL FIELD

The present disclosure relates to a system of actuating a door, in particular an access door or gate or a garage door.

BACKGROUND AND SUMMARY

A system of the present category for actuating a door comprises a plurality of actuators and a plurality of sensors for detecting a state of the system. It is possible that an actuator is controlled in dependence on a state of the system detected by the plurality of sensors.

It is a disadvantage that the plurality of sensors and actuators are often spaced far apart from one another and that they all have to be connected to a control unit. A large effort is required in this respect to connect actuators to be added or sensors to be added to the control unit and to carry out a corresponding coordination therewith.

It is the aim of the present disclosure to be able to make the integration of actuators or sensors of a system of actuating a door simpler and more efficient for the user.

In one example, this is done using a system of actuating a door in which the system comprises an actuator for driving an actuating motor of the system, in particular for carrying out an opening or closing movement of the door, a sensor for detecting a state of the system, and a control unit for linking the actuator and the sensor that is configured to control the system in its totality. The system is furthermore characterized in that the actuator, the sensor, and the control unit are each provided with a communication apparatus, wherein the plurality of communication apparatus are configured to automatically set up a wireless communication network between them.

The integration of a sensor or of an actuator into the system is thereby simplified. A respective communication apparatus that is connected to an associated actuator or to an associated sensor provides a bidirectional communication possibility with the other elements of the system. It is furthermore ensured by the capability of automatically joining a communication network of the other participants that a time-intensive and complicated integration into an already existing network is no longer required. A system of actuating a door that is simple to expand or can be modified as desired and that can be updated with different functions over time is created by the automatic integration into the network formed by the individual elements of the system provided with a communication apparatus.

In accordance with an optional modification of the present disclosure, the plurality of communication apparatus are configured to set up a bidirectional radio system for communication between them. The bidirectionality between the individual communication apparatus provides a simple integration into a communication network. Protocol data required for setting up a network cannot only be transmitted, but also received. The case can even arise in this respect that a reception of data is only necessary for the integration into the communication network and a data reception is not required for the function of the sensor/actuator in the further course of the actuator or sensor integrated in this manner.

Every actuator and every sensor of the system is in this respect optionally provided with a respective communication apparatus. It is clear to the skilled person that the system can have a plurality of actuators and a plurality of sensors of which each is respectively provided with a corresponding communication apparatus.

Furthermore in accordance with the present disclosure the sensor can, for example, be a closing edge sensor, a spring fracture protection sensor, a slack rope protection sensor, a wicket door contact sensor, or a pull switch sensor, with more than one of the aforesaid sensors naturally also being able to be provided in the system.

The closing edge sensor is configured to recognize a correct closing of a door. If, in contrast, a door does not close correctly, this is recognized by the closing edge sensor that can induce counter measures or an error output by the forwarding of a signal correspondingly directed thereto.

A spring fracture protection sensor serves to sense the required spring on the moving up or down of a garage door as to whether a fracture of this spring is impending or has already occurred.

The slack rope protection sensor is configured to check the guide rope of a door, in particular of a garage door, as to whether it is sagging, that is has a slack guidance. If a rope has too slack a guidance, it can have a disadvantageous effect on the actuation of the door.

The wicket door contact sensor is a sensor that is configured to detect the opening or closing of a wicket door. A wicket door in this context is a door that is arranged in a garage door that enables a person to negotiate the garage door without moving the garage door itself out of its closed position. It is important to recognize in this door-in-door concept that an error-free movement of the door can only be ensured when the wicket door is in a closed state. If it is in an open state, in contrast, there is the risk of damage to the door on the moving out of a closed position.

A pull switch sensor is configured to check a pull switch as to whether it has been actuated. In this context, a pull switch comprises a rope hanging down from a ceiling or a chain hanging down from a ceiling that can also be reached by a user when the latter is in a motor vehicle. The user then typically drives up to the garage door, opens the window of his vehicle, and pulls the chain/rope interacting with the pull switch. In response to such an actuation, a signal is as a rule detected by the pull switch sensor that consequently results in an opening of the door.

The skilled person is aware that the system in accordance with the present disclosure can comprise a plurality of the sensors described in more detail above.

In accordance with a further optional modification of the present disclosure, the actuator is an actuating drive for carrying out an opening or closing movement of the door or an actuating drive for locking the door in an open and/or closed position. Provision can also be made in this respect that the system has both an actuating drive to carry out an opening or closing movement of the door and an actuating drive for locking the door in an open and/or closed position.

The actuating drive for carrying out an opening or closing movement of the door is typically the drive of the system that can move the door itself into a closed position or into an open position.

The actuating drive for locking the door secures the door that is in an open or closed position in said position in that, for example, the door is secured in its position by the motor-powered movement of a hook or of a bolt that can interact with the door. A movable latch can thus, for example, be traveled into a recess provided at the door for this purpose to prevent a levering open of a door in a closed position.

The control unit of the system can furthermore be configured to transmit a control command to the actuator on the basis of a state of the system detected by the sensor. The actuator can thus, for example, be controlled such that the door is moved in a closing direction for as long as the closing edge sensor has not yet recognized that the door is completely closed.

Provision can furthermore be made that the wireless communication network is based on communication by means of Bluetooth, optionally by means of Bluetooth Low Energy. These two radio technologies bring about advantages with respect to their energy consumption and the radio distance achievable therewith.

In accordance with a further optional modification of the present disclosure, the control unit comprises an input means that is configured to receive user inputs and to control the system in accordance with the inputs, with the input means optionally having a physical actuation interface for receiving the user inputs.

The input means can, however, also be configured in this context such that a user directs a desired actuation of the door with the aid of a mobile end device such as a transmitter or a cellular phone. A physical actuation interface such as a button or the like can, however, furthermore also be provided so that a user can initiate a desired function of the system by actuating the button or by another interaction.

In accordance with a further embodiment of the present disclosure, the door is an access door or gate or a garage door.

Further advantages, details and features of the present disclosure can be seen from the description of the FIGURE provided below.

BRIEF DESCRIPTION OF THE FIGURE

FIG. 1 shows a schematic representation of a door in accordance with the present disclosure.

DETAILED DESCRIPTION OF THE FIGURE

The system 100 for actuating a door 4 can be seen that has a so-called wicket door 5 in its door surface. Said wicket door serves the passing through of the door 4 in a closed state. It is then not separately necessary to move the door 4 into an open position so that the door 4 itself can be negotiated in an uncomplicated manner.

The system 100 is in this context equipped with a plurality of actuators 1, including an actuator 11 for driving the door 4, and sensors 2. They are connected to a control unit 3 via a communication network. In this respect, as in the connection between the control unit 3 and the actuator 11 for carrying out an opening or closing movement of the door 4, a conventional connection can also be provided with the help of a signal line 6. As a rule, however, the present disclosure provides a connection of the individual components of the system 100 via the wireless communication network that is automatically set up.

In some examples, control unit 3 includes a processor and non-transitory memory, the non-transitory memory having instructions stored therein for carrying out the various control actions described herein (e.g., instructions for carrying out the automatic setup of the wireless communication network between the plurality of communication apparatus). Control unit 3 receives signals from sensors 2 and sends signals to actuators 1 to adjust operation of the various components of the system, based on the received signals and the instructions and other data stored in the non-transitory memory. The receiving and sending of signals at control unit 3 may be carried out in a wired or wireless manner, e.g. via signal line 6 or the wireless communication network described herein.

Control unit 3 may further include an input means that is configured to receive user inputs and to control the system in accordance with the inputs. The input means optionally includes a physical actuation interface for receiving the user inputs. Alternatively, the input means may be configured such that a user directs a desired actuation of the door with the aid of a mobile end device such as a transmitter or a cellular phone, or such that a user can initiate a desired function of the system by actuating a physical actuation interface such as a button.

The spring fracture protection sensor 22 is configured in this respect to detect the fracture-safety of this spring. If such a spring has fractured, the sensor 22 will detect it and will forward a corresponding message to the control unit 3.

The slack rope protection sensor 23 will likewise send a report to the control unit 3 when it is detected that the guide rope of the door does not have sufficient tension.

The wicket door contact sensor 24, which detects a correct closing of the wicket door 5 in the door 4, can be recognized as a further sensor. If provision is made, for example, to move the door 4 into an open position, the wicket door contact is first checked as a rule to ensure that the wicket door 5 is in a closed state.

A pull switch sensor 25, which initiates an opening of the door by actuation, can furthermore be recognized.

As shown, a closing edge sensor 21 is arranged at a closing edge of the door. Closing edge sensor 21 is configured to recognize a correct closing of the door.

The latch 12 that locks the door 4 in a closed position in the embodiment shown can be recognized as a further actuator.

The present disclosure teaches that every actuator 1 or every sensor 2 has a communication apparatus that is configured to automatically set up a wireless communication network with other communication apparatus. It is thereby possible to integrate further sensors or actuators, also those not shown in FIG. 1, into the system 100 at a later point in time. It is only necessary to install the corresponding sensor 2 or actuator 1 in radio range of the other components of the system 100 so that an automatic integration into the communication network can take place.

The invention claimed is:

1. A system of actuating a door, comprising:
   an actuator for driving an actuating motor of the system;
   a sensor for detecting a state of the system; and
   a control unit for connecting the actuator and the sensor, the control unit configured to control the system,
      wherein the actuator, the sensor, and the control unit are each provided with a communication apparatus, respectively, and
      wherein the communication apparatuses of the actuator, the sensor, and the control unit are configured to automatically set up bidirectional wireless communication between one another for integration into a bidirectional wireless communication network.

2. The system in accordance with claim 1, wherein the bidirectional wireless communication network is a bidirectional radio system for communication of each communication apparatus with one another.

3. The system in accordance with claim 1, wherein the sensor is a closing edge sensor, a spring fracture protection sensor, a slack rope protection sensor, a wicket door contact sensor, or a pull switch sensor.

4. The system in accordance with claim 1, wherein the actuator is an actuating drive for carrying out opening and closing movements of the door.

5. The system in accordance with claim 1, wherein the control unit is configured to transmit a control command to the actuator on a basis of the state of the system detected by the sensor.

6. The system in accordance with claim 1, wherein the bidirectional wireless communication network is based on a communication by means of Bluetooth.

7. The system in accordance with claim 1, wherein the control unit comprises an input means that is configured to receive user inputs and to control the system in accordance with the user inputs.

8. The system in accordance with claim 1, wherein the door is an access door, an access gate, or a garage door.

9. The system in accordance with claim 1, wherein the actuator is an actuating drive for locking the door in an open and/or closed position.

10. The system in accordance with claim 1, wherein the system comprises additional actuators, the additional actuators including at least one of an actuating drive for carrying out opening and closing movements of the door and an actuating drive for locking the door in an open and/or closed position.

11. The system in accordance with claim 1, wherein the system comprises additional sensors for detecting the state of the system, the additional sensors including at least one of a closing edge sensor, a spring fracture protection sensor, a slack rope protection sensor, a wicket door contact sensor, and a pull switch sensor.

12. The system in accordance with claim 6, wherein the communication by means of Bluetooth is a communication by means of Bluetooth Low Energy/Bluetooth Smart.

13. The system in accordance with claim 7, wherein the input means comprises a physical actuation surface for accepting the user inputs.

14. The system in accordance with claim 1, further comprising an additional sensor, where the additional sensor comprises a corresponding communication apparatus that automatically sets up the bidirectional wireless communication network with the communication apparatus of each of the sensor, the actuator, and the control unit.

15. The system in accordance with claim 1, further comprising an additional actuator, where the additional actuator comprises a corresponding communication apparatus that automatically sets up the bidirectional wireless communication network with the communication apparatus of each of the sensor, the actuator, and the control unit.

\* \* \* \* \*